April 19, 1927.     A. BLACK     1,625,701
AIRPLANE AND OTHER AIRCRAFT BODY
Filed June 8, 1925     2 Sheets-Sheet 1
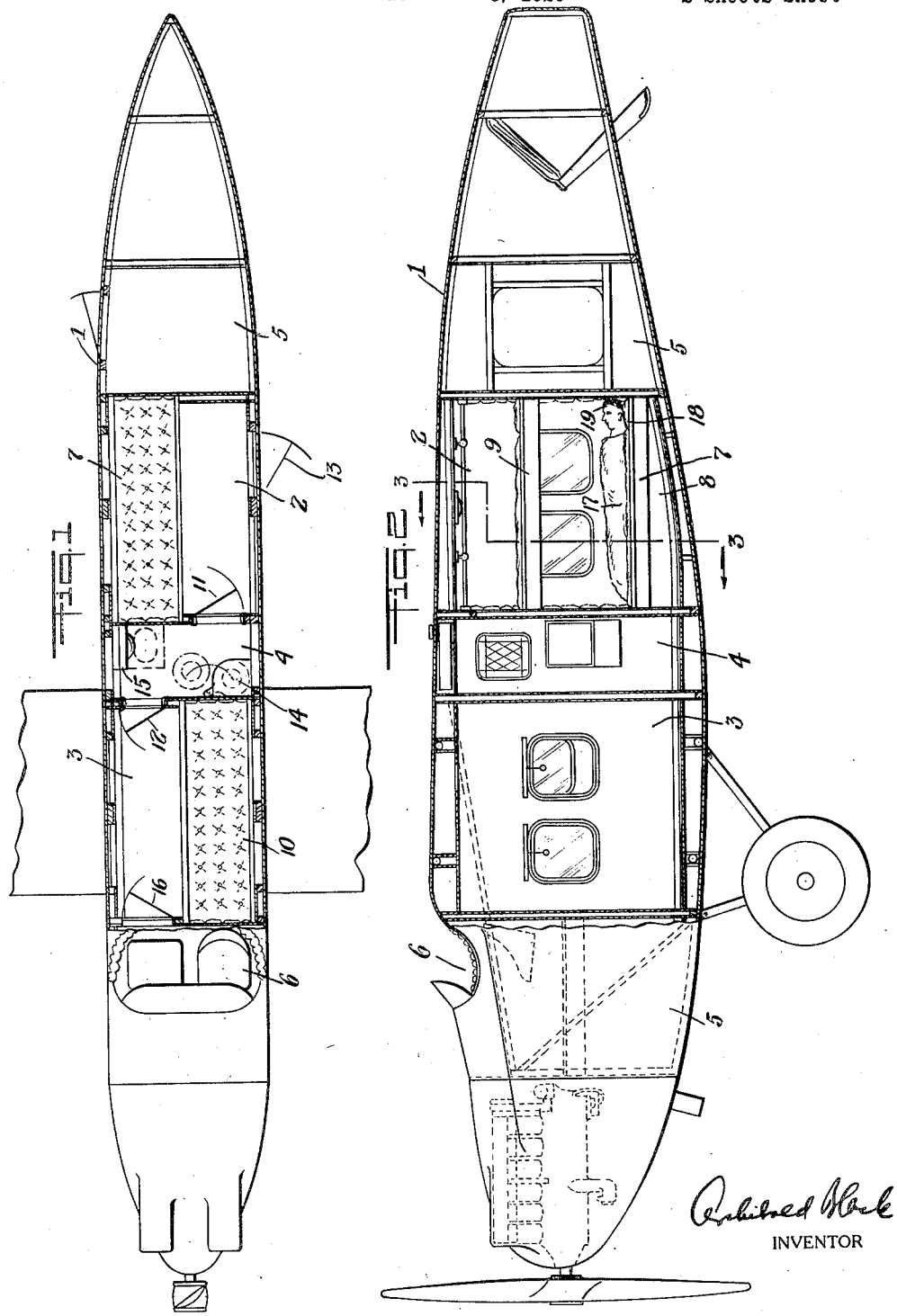
INVENTOR

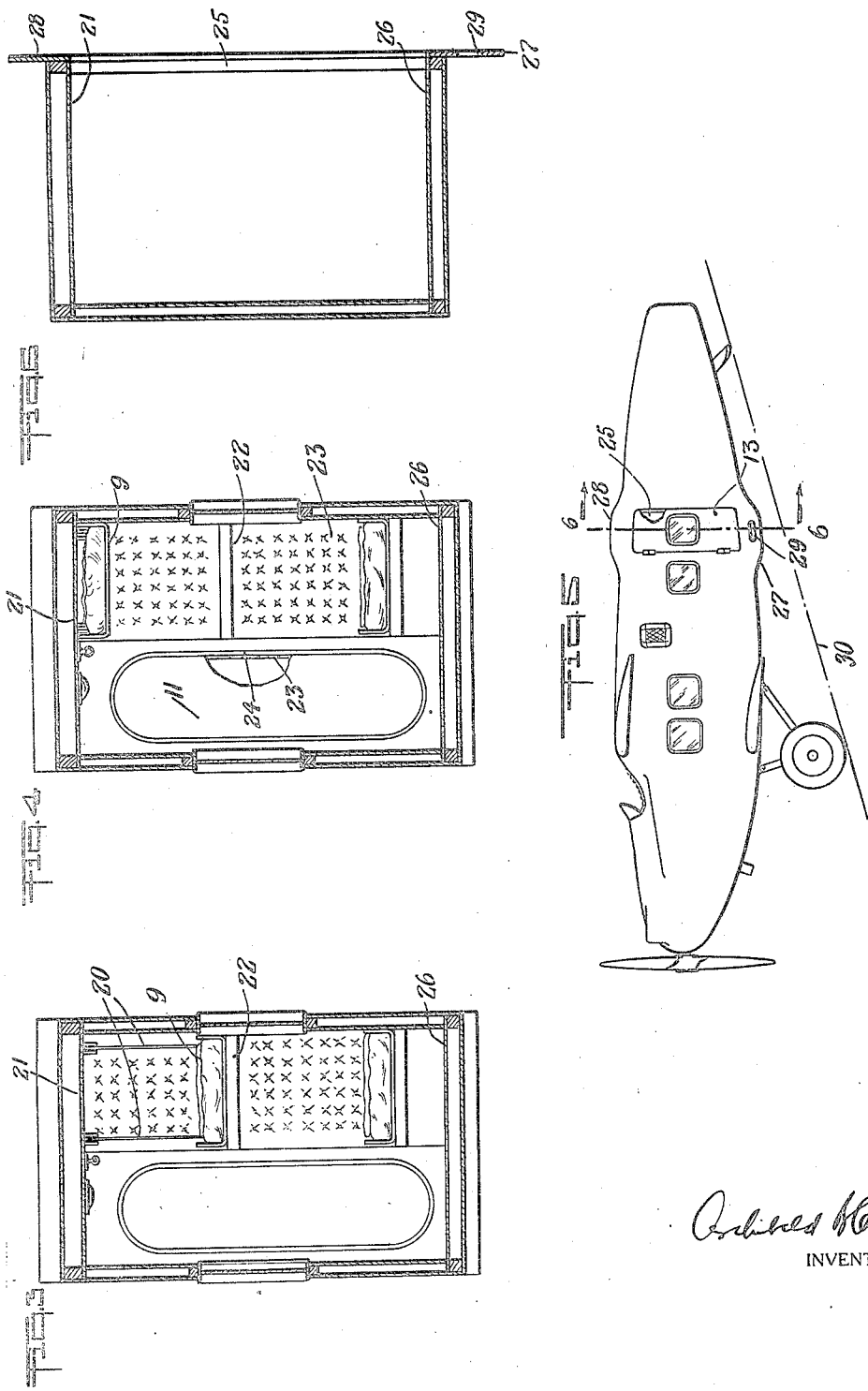

Patented Apr. 19, 1927.

1,625,701

UNITED STATES PATENT OFFICE.

ARCHIBALD BLACK, OF GARDEN CITY, NEW YORK.

AIRPLANE AND OTHER AIRCRAFT BODY.

Application filed June 8, 1925. Serial No. 35,755.

My invention relates to airplane and other aircraft bodies and more particularly to those constructed to be used for the transportation of passengers. It will be obvious, however, that certain features of my invention may also be used to advantage in the construction of airplane and other aircraft bodies, intended to be used for other purposes, without departing from the basic principles of the invention.

This invention provides a type of aircraft body which permits more convenient entry and exit; which prevents undesirably rapid shifting of weight within the cabins; which provides an improved distribution of weight within the cabins and which provides a safer and more advantageous arrangement of passenger facilities.

In the accompanying drawings, Fig. 1, is a plan view of an airplane body constructed in accordance with my invention, a part of the top of the body being shown removed for the purpose of exposing the interior arrangement. Fig. 2, is a side view of the body shown in Fig. 1, and having part of the side wall removed to expose the interior arrangement. Fig. 3, is a cross section through the body on the line 3—3 in Fig. 2, looking in the direction of the arrows, and showing the passenger facilities arranged as sleeping berths for night use. Fig. 4, is a cross section similar to Fig. 3, but showing the passenger facilities arranged for use as seats or couches. Fig. 5, is a view similar to Fig. 2, but with the side wall in place, showing the arrangement of the exterior and the method of carrying part of the side structure around the door opening. Fig. 6, is a cross section through the body on the line 6—6 in Fig. 5, looking in the direction of the arrows, showing the method of carrying the side structure above and below the door opening for the purpose of providing an opening approximately equal in height to the height of the cabin. The interior equipment of the body is not shown in Fig. 6, as it is fully illustrated in Figs. 1, 2, 3, and 4.

In Figs. 1, and 2, body 1, is provided with cabins 2, and 3, toilet 4, baggage compartments 5, and pilot's cockpit 6. Cabin 2, is provided with lower sleeping berth 7, baggage space 8, below berth 7, and upper sleeping berth 9, while cabin 3, is provided with lower sleeping berth 10, and an upper sleeping berth similar to 9, and directly above 10. Both 7, and 10, may be used as berths, seats, or couches as desired. Lower berths 7, and 10, are located on opposite sides of body 1, for the purpose of distributing the weight of berths, passengers and other cabin contents, equally on each side of the center line of the body, and for the purpose of providing an arrangement which prevents dangerously rapid movement of passengers, baggage, or other weights, in either direction between the ends of the passenger space. Such shifting of weight rapidly from cabin to cabin would tend to change the flying balance of the airplane quicker than it could be perceived and rectified by the pilot and might cause accident, particularly if the airplane were being taken off or being landed at the moment. With my invention such shifting of baggage, or movement of pasengers, is retarded by the staggered arrangement of cabins 2, and 3, berths or seats 7, and 10, and doors 11, and 12. Access to cabin 2, is obtained through door 13, while the airplane is at rest. Passage between cabins 2, and 3, through toilet 4, is possible at any time by the use of doors 11, and 12. Toilet facilities 14, and 15, are devised to fold or swing out of the way to permit passage in this manner. Doors 11, and 12, are arranged to lock from the inside of the toilet 4, permitting its use by any of the occupants of the airplane. Door 16, is provided to permit passage between cabin 3, and pilot's cockpit 6. When any of the berths, such as 7, used for sleeping, bedding 17, and pillow 18, are arranged so that occupant 19, lies with his, or her, feet toward the forward part of the airplane instead of the reverse position as is customary in railroad car use. Thus, if the airplane should be so landed as to severely shake its passengers, the occupants as 19, of sleeping berths will be less in danger of encountering head injuries. Similarly, in event of the airplane making a nose dive to earth, the occupants of berths will land upon their feet instead of upon their heads as would be the case were the berths arranged in the customary manner.

In Figs. 3, and 4, upper berth 9, is movable vertically, being carried by cords 20, located at its corners and arranged with some convenient method of counterbalancing the weight of berth 9, to more readily permit its movement. When not in use berth 9, is raised up to ceiling 21, as in Fig. 4, and, when desired, 9, may be drawn down against stop 22, and locked in some coventional manner to hold it in the lowered position. If passengers should happen to pass through doors such as 11, or 12, while the airplane was being landed, the shock of impact might, sometimes, cause injury by violently throwing them against the door frame. Under similar conditions passengers might also be injured by being thrown against other parts of the structure or of the cabin equipment. To prevent injuries resulting from such happenings, I provide padding 23, on any edges or projecting parts such as frame 24, for door 11, and on any other portions of the inside of cabins 2, and 3, and toilet 4, as may be necessary to ensure the safety of passengers against injuries of this kind.

In Figs. 5, and 6, opening 25, for door 13, extends from floor 26, to ceiling 21, the strength of the side being maintained by carrying extension 27, under and extension 28, above the opening 25. As extensions 27, and 28, are formed of relatively thin material and are set edgewise to the direction of motion of the airplane, the resistance of the body to motion through the air is not appreciably affected by their projection in this manner, while, at the same time, the structural strength of the side of the body is maintained around the door opening. In lower extension 27, I provide step 29, for the use of passengers entering by door 13, when the body is at rest on ground line 30.

Having thus described my invention I claim as new and desire to secure by Letters Patent:

1. An aircraft body having side walls defining a load carrying compartment, an opening in one side wall to give access to said compartment, and a portion of the said side wall structure extending above the top of the body and above the top of the compartment at said opening, to provide the structural strength for the said side wall above the door opening and being arranged to offer minimum resistance to flight.

2. An aircraft body having side walls defining a load carrying compartment, an opening in one side wall to give access to said compartment, and a portion of the side wall structure extending below the bottom of the body and below the bottom of the compartment at said opening, to provide the structural strength for the said side wall below the door opening and being arranged to offer minimum resistance to flight.

3. An aircraft body having side walls defining a load carrying compartment, an opening in one side wall to give access to said compartment, a portion of the side wall structure extending above the top of the body and above the top of the compartment at said opening, and a portion of the side wall structure extending below the bottom of the body and below the bottom of the compartment at said opening, to provide the structural strength for the said side wall above and below the door opening and being arranged to offer minimum resistance to flight.

4. An aircraft body having side walls defining a load carrying compartment, an opening in one side wall to give access to said compartment, a portion of the side wall structure extending below the bottom of the body and below the bottom of the compartment at said opening, to provide the structural strength for the said side wall below the said opening and being arranged to offer minimum resistance to flight, and a foot step carried by said extension.

5. An aircraft body comprising a pilot accommodating compartment, a load carrying compartment, an opening providing access to the latter compartment and staggered internal obstacles within the latter compartment for preventing undesirable freedom of movement of the load within the said compartment.

6. An aircraft body comprising a pilot accommodating compartment, a passenger accommodating compartment, a doorway providing access to the latter compartment and staggered passenger carrying means located within the said compartment in symmetrical order to ensure stability of balance of the aircraft.

7. An aircraft body comprising passenger accommodating compartments, arranged one behind the other, an intervening compartment, and doorways in staggered relation to each other and providing communication between said intervening compartment and the fore and aft compartments.

8. An aircraft body having a plurality of passenger accommodating spaces, and berths in each of the said spaces staggered with respect to the longitudinal center line of the aircraft.

9. An aircraft body having a plurality of passenger accommodating compartments, and a fixed lower berth and an upper berth in each compartment, the said berths being staggered with respect to the longitudinal center line of the aircraft.

In testimony whereof, I have signed my name to this specification this first day of June, 1925.

ARCHIBALD BLACK.